(12) United States Patent
Otsuka et al.

(10) Patent No.: US 8,207,722 B2
(45) Date of Patent: Jun. 26, 2012

(54) DC/DC CONVERTER

(75) Inventors: Masafumi Otsuka, Kawasaki (JP);
Yoichi Tokai, Tokyo (JP); Ryo Tanifuji,
Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 389 days.

(21) Appl. No.: 12/547,050

(22) Filed: Aug. 25, 2009

(65) Prior Publication Data
US 2010/0052627 A1 Mar. 4, 2010

(30) Foreign Application Priority Data

Aug. 26, 2008 (JP) ................................. 2008-217068

(51) Int. Cl.
*G05F 1/40* (2006.01)
(52) U.S. Cl. ....................................... 323/285; 323/280
(58) Field of Classification Search .................. 323/222, 323/225, 282–286, 293, 275, 280
See application file for complete search history.

(56) References Cited

U.S. PATENT DOCUMENTS

| 5,708,356 A * | 1/1998 | Onodera ....................... 323/275 |
| 5,949,229 A * | 9/1999 | Choi et al. ..................... 323/320 |
| 2006/0043942 A1* | 3/2006 | Cohen ........................... 323/207 |
| 2007/0247121 A1* | 10/2007 | Wu et al. ....................... 323/222 |
| 2008/0122422 A1* | 5/2008 | Zhang et al. ................... 323/351 |

FOREIGN PATENT DOCUMENTS

| JP | 2002-359977 A | 12/2002 |
| JP | 2005218166 | 8/2005 |
| JP | 2007-236194 A | 9/2007 |
| JP | 2008-187795 A | 8/2008 |

OTHER PUBLICATIONS

Dual 1 W Output Amoled Driver Supply; Publication Order No. NCP5810/D; Aug. 2007-Rev. 2; On Semiconductor- http://onsemi.com.
Japanese Office Action for Japanese Patent Application No. 2008-217068 Mailed on Nov. 30, 2010.

* cited by examiner

*Primary Examiner* — Adolf Berhane
(74) *Attorney, Agent, or Firm* — Turocy & Watson, LLP (57) ABSTRACT

A boost DC/DC converter has a voltage dividing circuit connected between the output terminal and the ground, that outputs a divided voltage obtained by dividing the output voltage; a reference voltage generating circuit that generates a reference voltage based on the input voltage; an error amplifier that outputs a first signal corresponding to the difference between the divided voltage and the reference voltage; a feedforward circuit that detects the input voltage and outputs a second signal corresponding to a current inversely proportional to the input voltage; a multiplier that multiples the first signal by the second signal and outputs a third signal obtained; and a control circuit that outputs, based on the third signal, a control signal for controlling on/off of the switching transistor so that the divided voltage is equal to the reference voltage.

20 Claims, 7 Drawing Sheets

DC/DC CONVERTER

CROSS-REFERENCE TO RELATED APPLICATION

This application is based upon and claims the benefit of priority from the prior Japanese Patent Application No. 2008-217068, filed on Aug. 26, 2008, the entire contents of which are incorporated herein by reference.

BACKGROUND OF THE INVENTION

1. Field of the Invention

The present invention relates to a DC/DC converter for controlling an output voltage.

2. Background Art

Conventional DC/DC converters include a converter which uses an inductor to boost an input voltage and output the boosted voltage (e.g., see Japanese Patent Laid-Open No. 2005-218166).

The conventional DC/DC converter stores energy in its inductor when its switching transistor is on. When the switching transistor is off, the converter superimposes the energy on the input voltage and extracts the superimposed voltage at its output. Therefore, the converter is a circuit which allows extracting the output voltage higher than the input voltage.

An output current depends on a current supplied from the inductor, and a change in the output current determines the output voltage.

A divided voltage obtained by dividing the output voltage with a voltage dividing resistance is fed back to an input of an error amplifier. The divided voltage and a reference voltage, which is generated from the input voltage, are maintained to be equal by controlling a switching element based on a signal outputted from a driver.

Thereby, the output voltage is controlled to be constant. Thus, the output voltage depends on the voltage dividing resistance and the reference voltage.

SUMMARY OF THE INVENTION

According to one aspect of the present invention, there is provided: a boost DC/DC converter comprising:
  an input terminal that receives an input voltage;
  an output terminal that outputs an output voltage;
  an inductor having a first end connected to the input terminal;
  a switching transistor connected between a second end of the inductor and a ground;
  a diode having an anode connected to the second end of the inductor and a cathode connected to the output terminal;
  a capacitor connected between the output terminal and the ground;
  a voltage dividing circuit connected between the output terminal and the ground, that outputs a divided voltage obtained by dividing the output voltage;
  a reference voltage generating circuit that generates a reference voltage based on the input voltage;
  an error amplifier that receives the divided voltage and the reference voltage and outputs a first signal corresponding to the difference between the divided voltage and the reference voltage;
  a feedforward circuit that detects the input voltage and outputs a second signal corresponding to a current inversely proportional to the input voltage;
  a multiplier that multiples the first signal by the second signal and outputs a third signal obtained; and
  a control circuit that outputs, based on the third signal, a control signal for controlling on/off of the switching transistor so that the divided voltage is equal to the reference voltage.

According to another aspect of the present invention, there is provided: a boost DC/DC converter comprising:
  an input terminal that receives an input voltage;
  an output terminal that outputs an output voltage;
  an inductor having a first end connected to the input terminal;
  a switching transistor connected between a second end of the inductor and a ground;
  a diode having an anode connected to the second end of the inductor and a cathode connected to the output terminal;
  a capacitor connected between the output terminal and the ground;
  a voltage dividing circuit connected between the output terminal and the ground, that outputs a divided voltage obtained by dividing the output voltage;
  a reference voltage generating circuit that generates a reference voltage based on the input voltage;
  an error amplifier that receives the divided voltage and the reference voltage and outputs a first signal corresponding to the difference between the divided voltage and the reference voltage;
  a feedforward circuit that detects the input voltage and outputs a second signal corresponding to a current inversely proportional to the input voltage;
  a multiplier that multiples the first signal by the second signal and outputs a third signal obtained;
  a control circuit that outputs, based on the third signal, a control signal for controlling on/off of the switching transistor so that the divided voltage is equal to the reference voltage; and
  a compensating circuit that regulates a phase of the first signal.

According to still other aspect of the present invention, there is provided: an inverting DC/DC converter comprising:
  an input terminal that receives an input voltage;
  an output terminal that outputs an output voltage;
  a switching transistor having a first end connected to the input terminal;
  an inductor connected between a second end of the switching transistor and a ground;
  a diode having a cathode connected to the second end of the switching transistor and an anode connected to the output terminal;
  a capacitor connected between the output terminal and the ground;
  a voltage dividing circuit connected between the output terminal and the ground, that outputs a divided voltage obtained by dividing the output voltage;
  a reference voltage generating circuit that generates a reference voltage based on the input voltage;
  an error amplifier that receives the divided voltage and the reference voltage and outputs a first signal corresponding to the difference between the divided voltage and the reference voltage;
  a feedforward circuit that detects the input voltage and outputs a second signal corresponding to a current inversely proportional to the input voltage;
  a multiplier that multiples the first signal by the second signal and outputs a third signal obtained; and
  a control circuit that outputs, based on the third signal, a control signal for controlling on/off of the switching transistor so that the divided voltage is equal to the reference voltage.

DETAILED DESCRIPTION

Comparative Example

Now, characteristics of the conventional boost DC/DC converter described above, as a comparative example, will be described.

Figure 1:
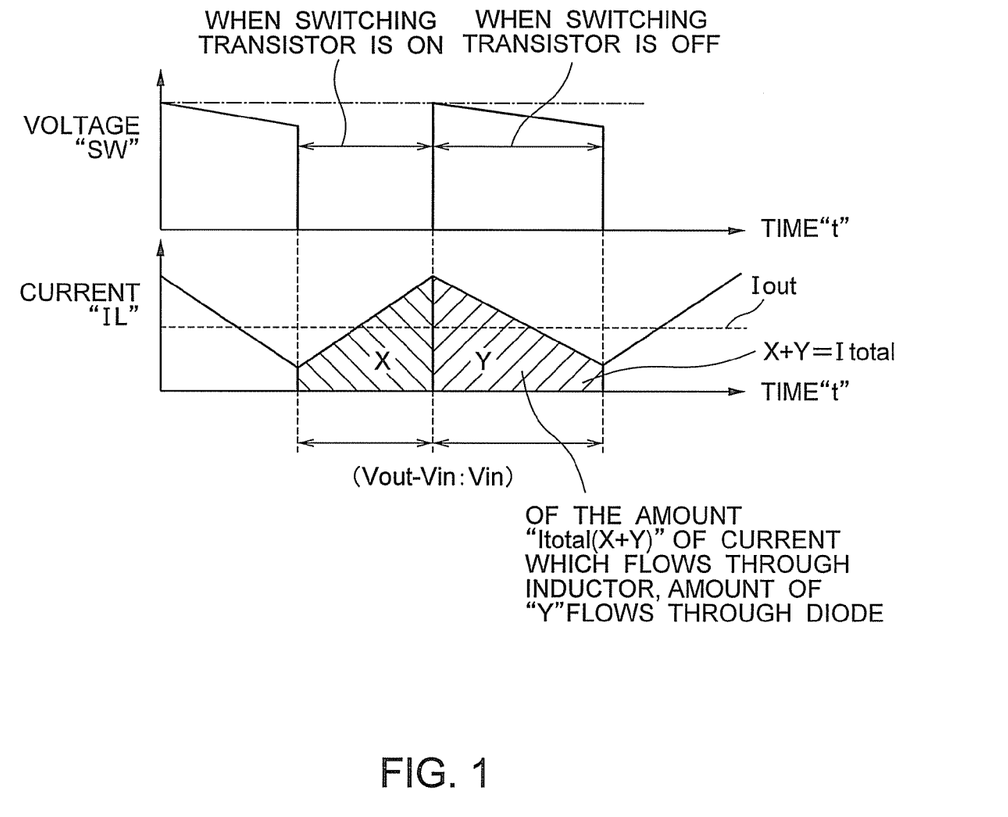
FIG. 1 is a figure showing a change in a voltage "SW" applied to a gate of a switching transistor in the boost DC/DC converter of the comparative example, and a change in a current "IL" which flows through an inductor in the converter.

FIG. 1 shows a change in a voltage "SW" applied to a gate of a switching transistor in the boost DC/DC converter of the comparative example, and a change in a current "IL" which flows through an inductor in the converter.

As shown in FIG. 1, when the switching transistor is on, the current flows through the inductor to store energy. The change in the current "IL" in this state is given by Expression (1).

$$\frac{dIL}{dt} = \frac{V_{in}}{L} \quad (1)$$

When the switching transistor is off, the energy stored in the inductor is outputted. The change in the current "IL" in this state is given by Expression (2).

$$\frac{dIL}{dt} = \frac{V_{out} - V_{in}}{L} \quad (2)$$

A part of the amount "Itotal(X+Y)" of a current that flows through the inductor is supplied to an output terminal 2 as an output current "Iout", the amount of which equals to the amount "Y" of a current that flows when the switching transistor is off.

As described above, the changes in the current "IL" in the two states, the ON and OFF states, of the switching transistor are given by Expressions (1) and (2) described above. As a result, the ratio of the duration of an ON state to that of an OFF state of the switching transistor, "ron:roff", is given by Expression (3).

$$\text{ron:roff} = (V_{out} - V_{in}) : V_{in} \quad (3)$$

As a result, Expressions (4) to (6) below are obtained.

$$I_{out} = I_{total} \times \frac{V_{in}}{V_{out} - V_{in} + V_{in}} = I_{total} \times \frac{V_{in}}{V_{out}} \quad (4)$$

$$V_{out} = \frac{I_{total}}{I_{out}} \times V_{in} \quad (5)$$

$$V_{out} \propto A \times V_{in} \quad (6)$$

As represented by Expressions (4) to (6), the output current "Iout" (the output voltage "Vout") is proportional to the input voltage "Vin". "Iout" given by Expression (4) is an average value of the current outputted from the output terminal during a time period from the beginning of an ON state to the end of the following OFF state of the switching transistor.

The reference voltage inputted to an error amplifier is generated from the input voltage "Vin". Therefore, the reference voltage is also affected in proportion to the input voltage "Vin".

Both of the reference voltage "Vref" and the divided voltage "VFB" that are inputted to the error amplifier are affected by "Vin". Therefore, the output of the error amplifier is proportional to the input voltage "Vin".

As described above, since a change in the output current causes a change in the output voltage, the output voltage is affected in proportion to the input voltage. In particular, the output voltage is greatly affected by a sudden change in the input voltage. In this situation, the error amplifier operates to maintain regulation. However, the change in the output voltage is too large to be immediately followed by the response of the error amplifier. As a result, the Line Transient characteristic of the output voltage largely deteriorates, which increases ripples in the output voltage.

As described above, a problem has arisen that the DC/DC converter of the comparative example may produce large overshoot and ringing in the output voltage when the input voltage changes.

The object of the present invention is to provide a DC/DC converter which can reduce the effect of the input voltage on the output voltage.

Hereinafter, embodiments according to the present invention will be described with reference to the drawings.

First Embodiment

In a first embodiment, an exemplary boost DC/DC converter in particular will be described.

Figure 2:
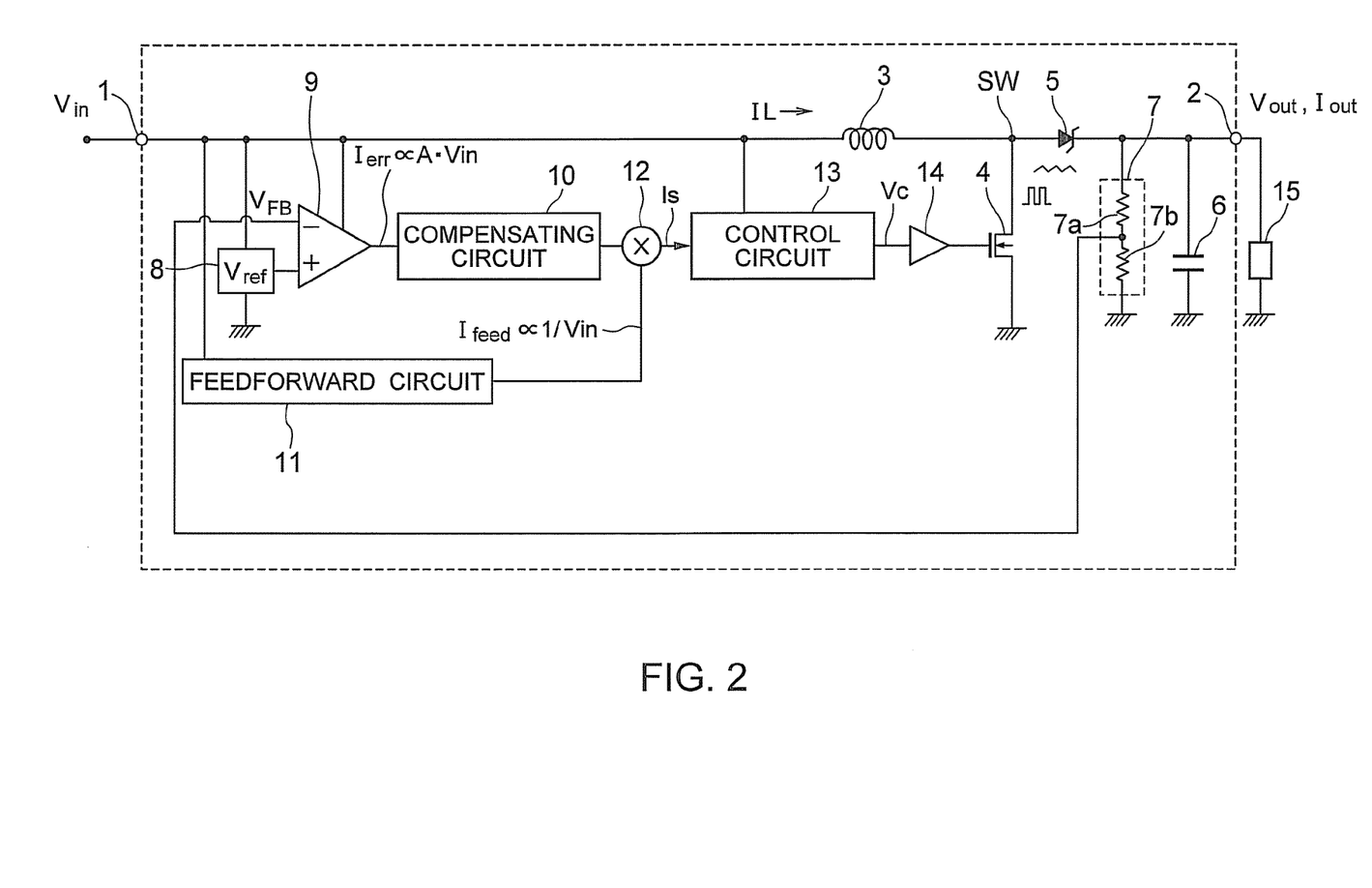
FIG. 2 is a circuit diagram showing an exemplary configuration of a DC/DC converter 100 of the first embodiment, an aspect of the present invention.

FIG. 2 is a circuit diagram showing an exemplary configuration of a DC/DC converter 100 of the first embodiment, an aspect of the present invention.

As shown in FIG. 2, the DC/DC converter 100 includes an input terminal 1, an output terminal 2, an inductor 3, a switching transistor 4, a diode 5, a capacitor 6, a voltage dividing circuit 7, a reference voltage generating circuit 8, an error amplifier 9, a compensating circuit 10, a feedforward circuit 11, a multiplier 12, a control circuit 13, and a driver 14.

The input terminal 1 is connected to a DC power supply (not shown), and receives the input voltage "Vin".

The output terminal 2 is connected to a load 15, and outputs (supplies) the output voltage "Vout" to the load 15.

The inductor 3 has a first end connected to the input terminal 1.

The switching transistor 4 is connected between a second end of the inductor 3 and a ground "GND". The switching transistor 4 in this embodiment is an nMOS transistor. The switching transistor 4 may be, as necessary, a pMOS transistor or a bipolar transistor with a signal polarity set as appropriate.

The diode 5 has an anode connected to the second end of the inductor 3, and a cathode connected to the output terminal 2.

The capacitor 6 is connected between the output terminal 2 and the ground "GND". Charging the capacitor 6 increases the voltage "Vout" of the output terminal 2, while discharging the capacitor 6 decreases the voltage "Vout" of the output terminal 2.

The voltage dividing circuit 7 is connected between the output terminal 2 and the ground "GND". The voltage dividing circuit 7 outputs the divided voltage "VFB" obtained by dividing the output voltage "Vout".

The voltage dividing circuit 7 has a first voltage dividing resistance 7a having a first end connected to the output terminal 2, and a second voltage dividing resistance 7b connected between a second end of the first voltage dividing resistance 7a and the ground "GND". The voltage dividing circuit 7 outputs the divided voltage "VFB" obtained by dividing the output voltage "Vout" by the voltage dividing ratio of the first and the second voltage dividing resistances 7a, 7b.

The reference voltage generating circuit 8 is connected between the input terminal 1 and the ground "GND". The reference voltage generating circuit 8 generates the reference voltage "Vref" based on the input voltage "Vin".

The error amplifier 9 receives the divided voltage "VFB" and the reference voltage "Vref" and outputs a first signal "Ierr" which corresponds to the difference between the divided voltage "VFB" and the reference voltage "Vref".

The compensating circuit 10 regulates a phase of the first signal "Ierr".

The feedforward circuit 11 detects the input voltage "Vin" and outputs a second signal "Ifeed" which corresponds to a current inversely proportional to the input voltage "Vin". The second signal "Ifeed" is equivalent to a current "Ic3".

The multiplier 12 multiplies the first signal "Ierr" by the second signal "Ifeed" and outputs a third signal "Is" obtained.

The control circuit 13 outputs, based on the third signal "Is", a control signal "Vc" for controlling the ON/OFF state of the switching transistor 4 so that the divided voltage "VFB" is equal to the reference voltage "Vref". For example, the control circuit 13 lengthens the time period of the ON state of the switching transistor 4 when the level of the third signal "Is" is higher than the reference level, and shortens the time period of the ON state of the switching transistor 4 when the level of the third signal "Is" is lower than the reference level.

The driver 14 amplifies the control signal "Vc" outputted by the control circuit 13, and applies the amplified signal to the gate (control electrode) of the switching transistor 4.

Figure 3:
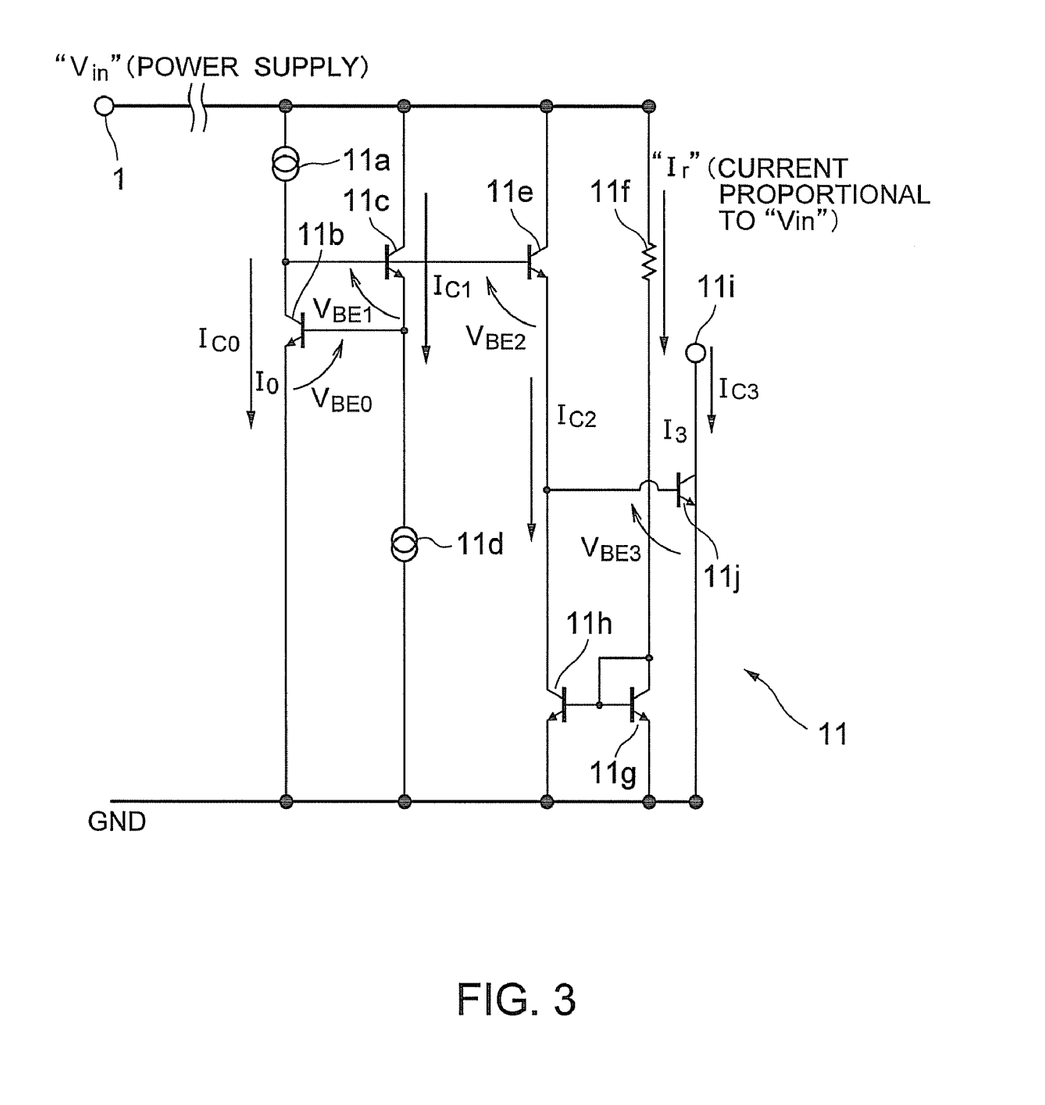
FIG. 3 is a figure showing an exemplary circuit configuration of the feedforward circuit 11 of the DC/DC converter 100 shown in FIG. 2.

FIG. 3 shows an exemplary circuit configuration of the feedforward circuit 11 of the DC/DC converter 100 shown in FIG. 2.

As shown in FIG. 3, the feedforward circuit 11 has a first constant current source 11a, a first transistor 11b, a second transistor 11c, a second constant current source 11d, a third transistor 11e, a resistance element 11f, a fourth transistor 11g, a fifth transistor 11h, a signal terminal 11i, and a sixth transistor 11j.

The first constant current source 11a has a first end connected to the input terminal 1.

The first transistor 11b is an NPN-type bipolar transistor. The first transistor 11b is connected between a second end of the first constant current source 11a and the ground "GND". Through the first transistor 11b flows a current "Ic0".

The second transistor 11c is an NPN-type bipolar transistor of the same conduction type as that of the first transistor 11b. The second transistor 11c has a first end (collector) connected to the input terminal 1, and a second end (emitter) connected to a control electrode (base) of the first transistor 11b. Through the second transistor 11c flows a current "Ic1".

The second constant current source 11d is connected between the second end (emitter) of the second transistor 11c and the ground "GND".

The third transistor 11e is an NPN-type bipolar transistor of the same conduction type as that of the first transistor 11b. The third transistor 11e has a first end (collector) connected to the input terminal 1, and a control electrode (base) connected to a first end (collector) of the first transistor 11b.

The resistance element 11f has a first end connected to the input terminal 1. Through the resistance element 11f flows a current "Ir" proportional to the input voltage "Vin".

The fourth transistor 11g is, for example, an NPN-type bipolar transistor. The fourth transistor 11g is connected between a second end of the resistance element 11f and the ground "GND". The fourth transistor 11g is diode-connected.

The fifth transistor 11h is, for example, an NPN-type bipolar transistor. The fifth transistor 11h is connected between a second end (emitter) of the third transistor 11e and the ground "GND".

Thereby, the fourth transistor 11g and the fifth transistor 11h constitute a current mirror circuit. As a result, through the fifth transistor 11h flows a current "Ic2" which mirrors the current "Ir" which flows through the fourth transistor 11g.

Consequently, the current "Ic2" is proportional to the input voltage "Vin".

The signal terminal 11i is connected to the input of the multiplier 12, and outputs the second signal "Ifeed".

The sixth transistor 11j is, for example, an NPN-type bipolar transistor. The sixth transistor 11j is connected between the signal terminal 11i and the ground "GND", and has a control electrode (base) connected to the second end (emitter) of the third transistor 11e.

Through the sixth transistor 11j, the current "Ic3" inversely proportional to the current "Ic2" flows as described below. The current "Ic3" corresponds to the second signal "Ifeed".

Now, output characteristics of the DC/DC converter 100 having the configuration as described above will be described.

Firstly, Expression (7) gives the relation among the voltages between the base and the emitter of the first to the third transistors, and the sixth transistor 11b, 11c, 11e, and 11j in the feedforward circuit 1.

$$V_{BE0} + V_{BE1} = V_{BE2} + V_{BE3} \quad (7)$$

The base voltage "VBE" is typically given by Expression (8), where "q" represents the unit electronic charge, "k" the Boltzmann constant, and "t" absolute temperature.

$$V_{BE} = \frac{kt}{q}\log\left(\frac{I_c}{I_s}\right) \quad (8)$$

Consequently, the relation among the currents "Ic0" to "Ic3" represented below as in Expression (9) is derived from Expression (7) and Expression (8).

$$I_{C0} \times I_{C1} = I_{C2} \times I_{C3} \quad (9)$$

The current "Ic3" represented as in Expression (10) is obtained by a transformation of Expression (9).

$$I_{C3} = \frac{I_{C0} \times I_{C1}}{I_{C2}} \quad (10)$$

As described above, the current "Ir" is proportional to the input voltage "Vin". Therefore, by the current mirror circuit made of the fourth and fifth transistors 11g and 11h, the current "Ic2" is made to be proportional to the input voltage "Vin".

The current "Ic0", "Ic1" is a constant current. Then, according to Expression (10) the current "Ic3" is kept to be inversely proportional to the input voltage "Vin".

Figure 4:
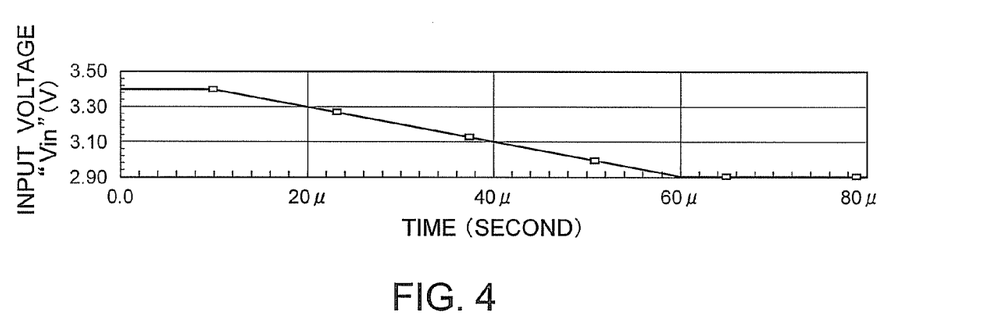
FIG. 4 is a figure showing a waveform of the input voltage "Vin" inputted to the input terminal 1 of the DC/DC converter 100 shown in FIG. 2.
Figure 5:
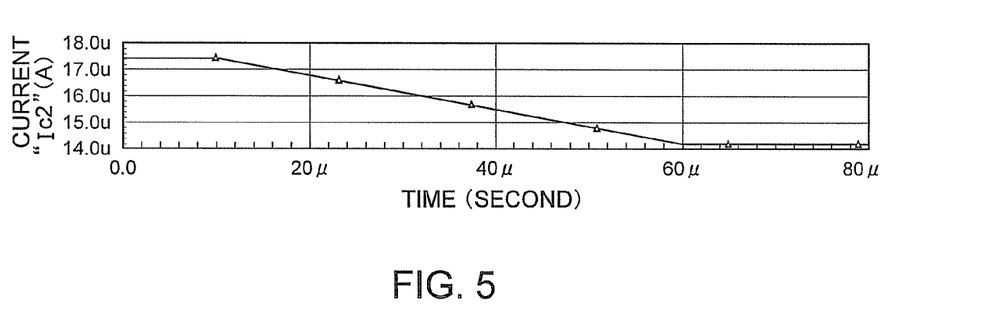
FIG. 5 is a figure showing a waveform of the current "Ic2" which flows through the feedforward circuit 11 of the DC/DC converter 100 shown in FIG. 2.
Figure 6:
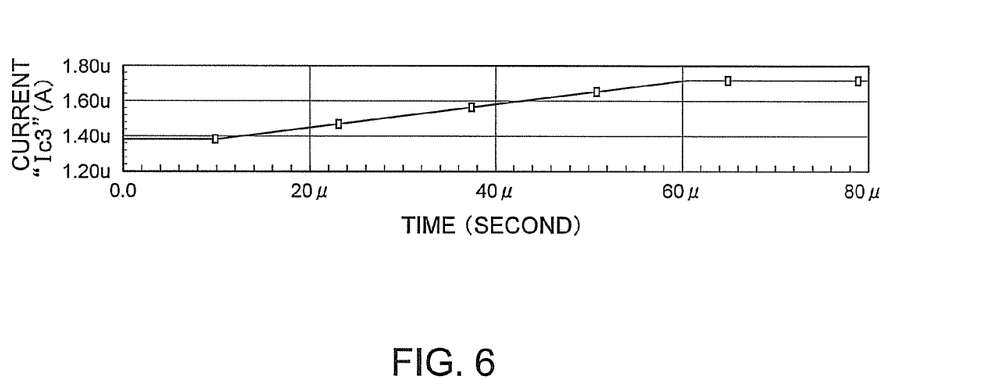
FIG. 6 is a figure showing a waveform of the current "Ic3" which flows through the feedforward circuit 11 of the DC/DC converter 100 shown in FIG. 2.

FIG. 4 shows a waveform of the input voltage "Vin" inputted to the input terminal 1 of the DC/DC converter 100 shown in FIG. 2. FIG. 5 shows a waveform of the current "Ic2" which flows through the feedforward circuit 11 of the DC/DC converter 100 shown in FIG. 2. FIG. 6 shows a waveform of the current "Ic3" which flows through the feedforward circuit 11 of the DC/DC converter 100 shown in FIG. 2.

As shown in FIGS. 4 to 6, a simulation result is obtained that the current "Ic3" is inversely proportional to the input voltage "Vin" (i.e., the current "Ic2").

As described above, the feedforward circuit 11 detects the input voltage "Vin" and outputs the second signal "Ifeed" which corresponds to the current "Ic3" inversely proportional to the input voltage "Vin". The second signal "Ifeed" is equivalent to the current "Ic3".

As described above, the multiplier 12 multiplies the output from the error amplifier by the signal "Ifeed" inversely proportional to the input voltage "Vin", and the multiplication result will be the signal "Is". In the signal "Is", the above-described effect of the input voltage "Vin" is offset. Based on the signal "Is", the control circuit 13 controls the switching transistor 4.

That is, the right side of Expression (6) described above is multiplied by a term inversely proportional to the input voltage "Vin", which offsets the input voltage "Vin". This allows the DC/DC converter 100 to have the output current "Iout" (the output voltage "Vout") which is not affected by the input voltage "Vin".

Figure 7:
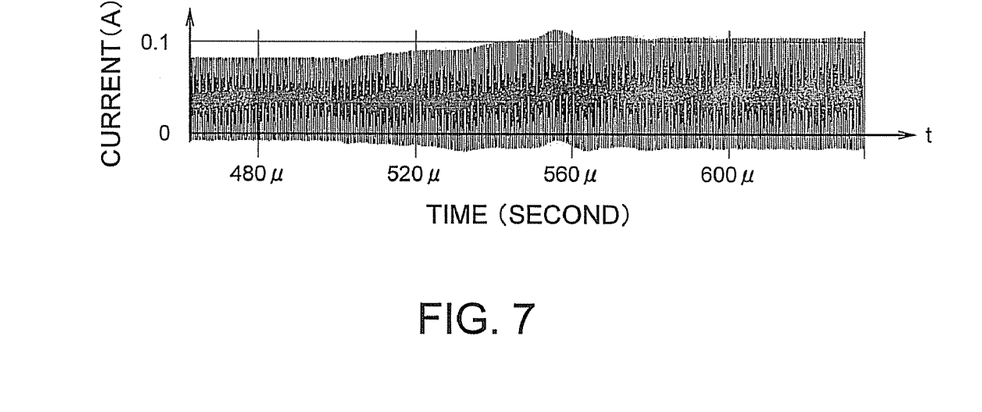
FIG. 7 is a figure showing a waveform of the input voltage "Vin" of the DC/DC converter 100 shown in FIG. 2.
Figure 8:
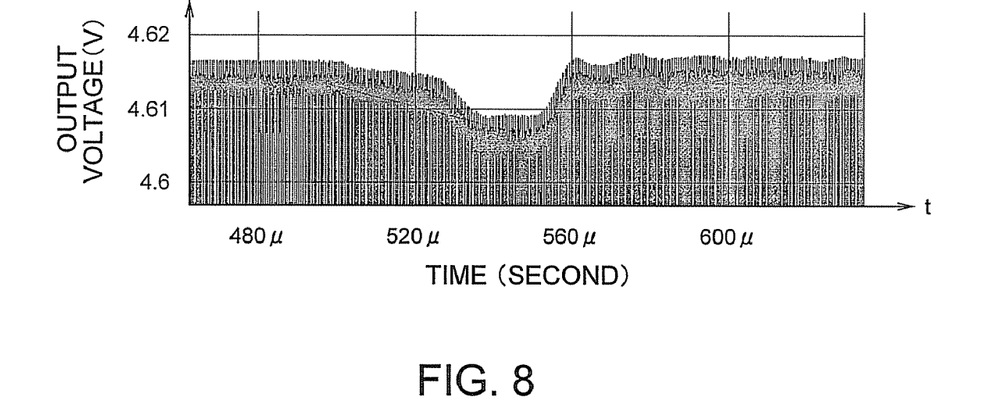
FIG. 8 is a figure showing a waveform of the current which flows through the inductor 3 of the DC/DC converter 100 shown in FIG. 2.
Figure 9:
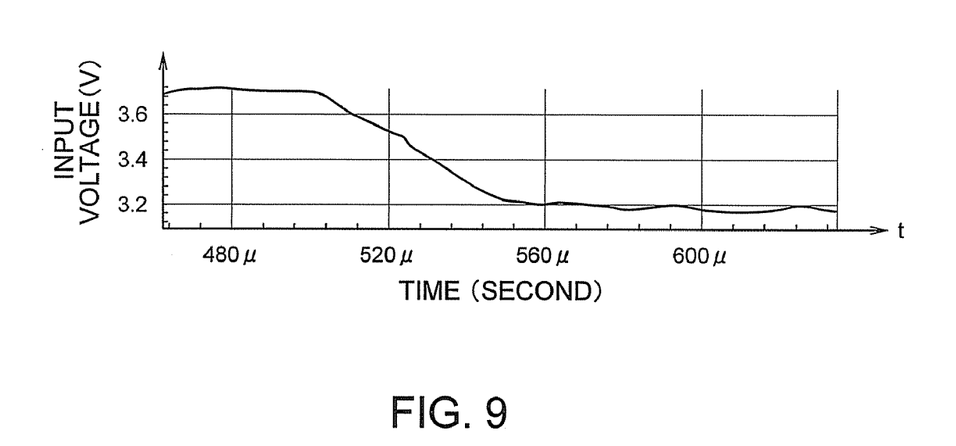
FIG. 9 is a figure showing a waveform of the output voltage "Vout" of the DC/DC converter 100 shown in FIG. 2.

FIG. 7 shows a waveform of the input voltage "Vin" of the DC/DC converter 100 shown in FIG. 2. FIG. 8 shows a waveform of the current which flows through the inductor 3 of the DC/DC converter 100 shown in FIG. 2. FIG. 9 shows a waveform of the output voltage "Vout" of the DC/DC converter 100 shown in FIG. 2.

As shown in FIGS. 7 to 9, a change (overshoot) in the output voltage "Vout" is 6.8 mV when the input voltage "Vin" is changed from 3.7 V to 3.2 V in 50 μ seconds. In a similar condition, the configuration of the comparative example results in a change (overshoot) in the output voltage "Vout" being 260 mV.

Thus, the DC/DC converter 100 according to the first embodiment has a much better Line Transient characteristic and a smaller overshoot than the comparative example even in the case of a rapid change in the input voltage "Vin".

As described above, the DC/DC converter according to the embodiment can reduce the effect of the input voltage on the output voltage.

Second Embodiment

In the first embodiment, an example of a boost DC/DC converter has been described.

The present invention may also be applied to an inverting DC/DC converter.

The inverting DC/DC converter stores energy in an inductor when a switching transistor is on. When the switching transistor is off, the DC/DC converter releases the stored energy so that a current flows through a capacitor and a diode, which are connected to an output terminal, to charge the output capacitor. In this situation, the ground side of the output capacitor is positive so that a negative voltage can be outputted.

Figure 10:
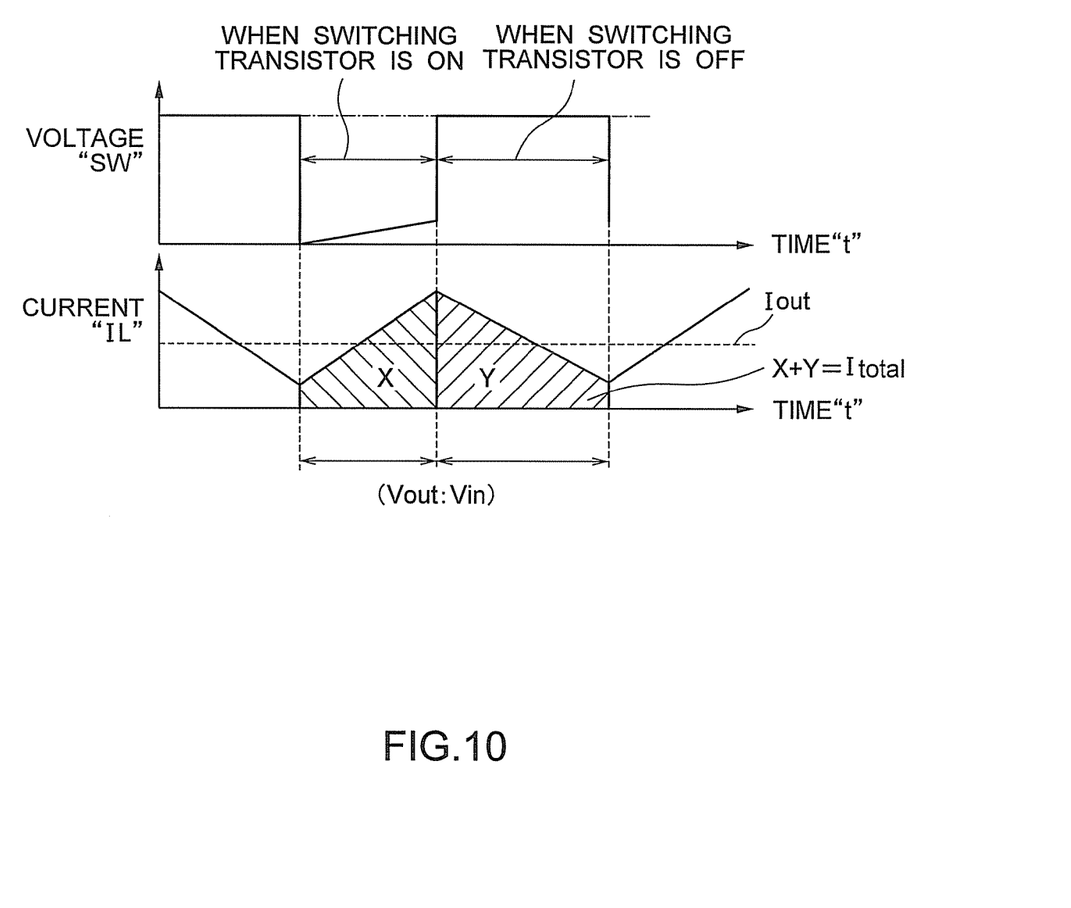
FIG. 10 is a figure showing a change in the voltage "SW" applied to the gate of the switching transistor in the inverting DC/DC converter as a comparative example, and a change in a current "IL" which flows through the inductor in the converter.

FIG. 10 shows a change in the voltage "SW" applied to the gate of the switching transistor in the inverting DC/DC converter as a comparative example, and a change in a current "IL" which flows through the inductor in the converter As described above, when the switching transistor is on, energy is stored in the inductor. The change in the current "IL" in this state is given by Expression (11).

$$\frac{dIL}{dt} = \frac{V_{in}}{L} \quad (11)$$

When the switching transistor is off, the energy stored in the inductor is outputted. The change in the current "IL" in this state is given by Expression (12).

$$\frac{dIL}{dt} = \frac{V_{out}}{L} \quad (12)$$

Similar to the boost converter, a part of the amount "Itotal (X+Y)" of a current that flows through the inductor is supplied to the output terminal 2 as an output current "Iout", the amount of which equals to the amount "Y" of a current that flows when the switching transistor is off.

As described above, the changes in the current "IL" in the two states, the ON and OFF states, of the switching transistor are given by Expressions (11) and (12) described above. As a result, the ratio of the duration of an ON state to that of an OFF state of the switching transistor, "ron:roff", is given by Expression (13).

$$\text{ron:roff} = V_{out}:V_{in} \quad (13)$$

As a result, Expressions (14) to (16) below are obtained.

$$I_{out} = I_{total} \times \frac{V_{in}}{V_{out} + V_{in}} \quad (14)$$

$$V_{out} = \frac{I_{total}}{I_{out}} \times V_{in} - V_{in} \quad (15)$$

$$V_{out} \propto A \times V_{in} - 1 = (A-1) \times V_{in} \quad (16)$$

As represented by Expressions (14) to (16), the output current "Iout" (the output voltage "Vout") is proportional to the input voltage "Vin". "Iout" given by Expression (14) is an average value of the current outputted from the output terminal during a time period from the beginning of an ON state to the end of the following OFF state of the switching transistor.

As described above, similar to the boost DC/DC converter, the inverting DC/DC converter may also produce large overshoot and ringing in the output voltage when the input voltage changes.

In a second embodiment, an exemplary inverting DC/DC converter will be described which can reduce the effect of the input voltage on the output voltage.

Figure 11:
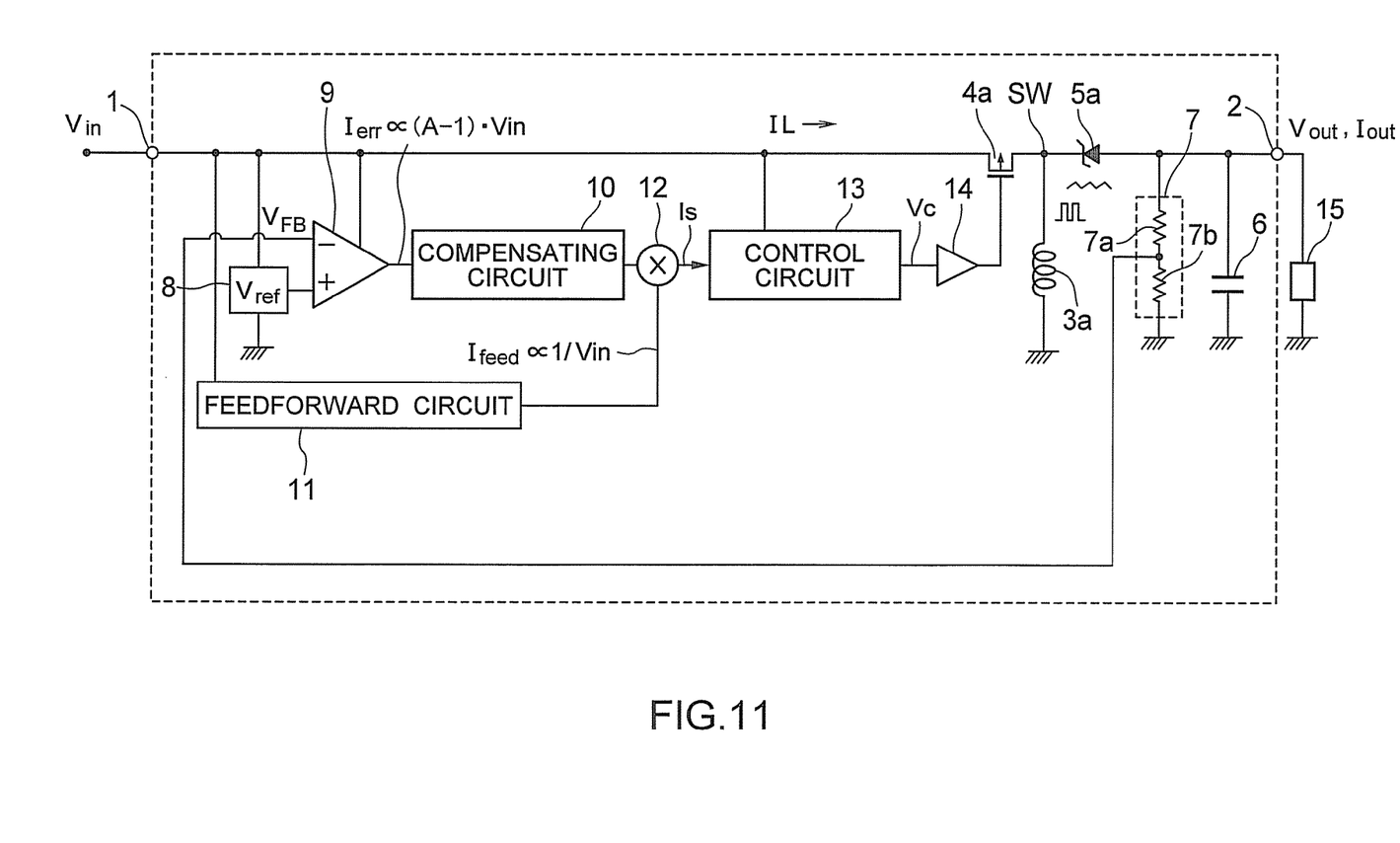
FIG. 11 is a circuit diagram showing an exemplary configuration of a DC/DC converter 200 of the second embodiment, an aspect of the present invention.

FIG. 11 is a circuit diagram showing an exemplary configuration of a DC/DC converter 200 of the second embodiment, an aspect of the present invention.

As shown in FIG. 11, the DC/DC converter 200 includes an input terminal 1, an output terminal 2, an inductor 3a, a switching transistor 4a, a diode 5a, a capacitor 6, a voltage dividing circuit 7, a reference voltage generating circuit 8, an error amplifier 9, a compensating circuit 10, a feedforward circuit 11, a multiplier 12, a control circuit 13, and a driver 14.

Compared with the boost DC/DC converter 100 shown in FIG. 2, the inverting DC/DC converter 200 shown in FIG. 11 has a similar configuration except for the configurations and connections of the inductor 3a, the switching transistor 4a, and the diode 5a.

The switching transistor 4a has a first end (source) connected to the input terminal 1. The switching transistor 4a in this embodiment is a PMOS transistor. The switching transistor 4a may be, as necessary, an nMOS transistor or a bipolar transistor with a signal polarity set as appropriate.

The inductor 3a is connected between a second end (drain) of the switching transistor 4a and the ground "GND".

The diode 5a has a cathode connected to the second end (drain) of the switching transistor 4a, and an anode connected to the output terminal 2.

The control circuit 13 outputs, based on the third signal "Is", the control signal "Vc" for controlling the ON/OFF state of the switching transistor 4a so that the divided voltage "VFB" is equal to the reference voltage "Vref". For example, the control circuit 13 lengthens the time period of the ON state of the switching transistor 4a when the level of the third signal "Is" is higher than the reference level, and shortens the time period of the ON state of the switching transistor 4a when the level of the third signal "Is" is lower than the reference level.

The driver 14 amplifies the control signal "Vc" outputted by the control circuit 13 and applies the amplified signal to a gate (control electrode) of the switching transistor 4a.

Output characteristics of the inverting DC/DC converter 200 having the above configuration is the same as those of the boost DC/DC converter described above.

That is, similar to the first embodiment, the feedforward circuit 11 detects the input voltage "Vin" and outputs the second signal "Ifeed" which corresponds to the current "Ic3" inversely proportional to the input voltage "Vin".

As described above, the multiplier 12 multiplies the output from the error amplifier by the signal "Ifeed" inversely proportional to the input voltage "Vin", and the multiplication result will be the signal "Is". In the signal "Is", the above-described effect of the input voltage "Vin" is offset. Based on the signal "Is", the control circuit 13 controls the switching transistor 4.

Similar to the first embodiment, this allows the DC/DC converter 200 to have the output current "Iout" (the output voltage "Vout") which is not affected by the input voltage "Vin".

As described above, the DC/DC converter according to the second embodiment can reduce the effect of the input voltage on the output voltage.

In the embodiments described above, the first to the sixth transistors in the configuration of the feedforward circuit 11 have been described as an NPN-type bipolar transistor.

Alternatively, the first to the sixth transistors in the configuration of the feedforward circuit 11 may be a PNP-type bipolar transistor or an MOS transistor. In the case of using an MOS transistor, the control electrode (base) described above corresponds to the gate of the MOS transistor, and the emitter/collector of the bipolar transistor to the source/drain of the MOS transistor.

What is claimed is:

1. A boost DC/DC converter comprising:
an input terminal that receives an input voltage;
an output terminal that outputs an output voltage;
an inductor having a first end connected to the input terminal;
a switching transistor connected between a second end of the inductor and a ground;
a diode having an anode connected to the second end of the inductor and a cathode connected to the output terminal;
a capacitor connected between the output terminal and the ground;
a voltage dividing circuit connected between the output terminal and the ground, that outputs a divided voltage obtained by dividing the output voltage;
a reference voltage generating circuit that generates a reference voltage based on the input voltage;
an error amplifier that receives the divided voltage and the reference voltage and outputs a first signal corresponding to the difference between the divided voltage and the reference voltage;
a feedforward circuit that detects the input voltage and outputs a second Signal corresponding to a current inversely proportional to the input voltage;
a multiplier that multiples 'the first signal by the second Signal and outputs a third signal obtained; and
a control circuit that outputs, based on the third signal, a control signal for controlling on/off of the switching transistor so that the divided voltage is equal to the reference voltage.

2. The DC/DC converter according to claim 1, wherein the switching transistor is a MOS transistor.

3. The DC/DC converter according to claim 1, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and
a sixth transistor connected between the signal terminal and the ground, having a control electrode connected to the second end of the third transistor.

4. The DC/DC converter according to claim 2, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and
a sixth transistor connected between the signal terminal and the ground, having a control electrode connected to the second end of the third transistor.

5. The DC/DC converter according to claim 3, wherein the first to sixth transistors are bipolar transistors.

6. The DC/DC converter according to claim 4, wherein the first to sixth transistors are bipolar transistors.

7. The DC/DC converter according to claim 3, wherein the first to sixth transistors are MOS transistors.

8. The DC/DC converter according to claim 4, wherein the first to sixth transistors are MOS transistors.

9. A boost DC/DC converter comprising:
an input terminal that receives an input voltage;
an output terminal that outputs an output voltage;
an inductor having a first end connected to the input terminal;
a switching transistor connected between a second end of the inductor and a ground;
a diode having an anode connected to the second end of the inductor and a cathode connected to the output terminal;
a capacitor connected between the output terminal and the ground;
a voltage dividing circuit connected between the output terminal and the ground, that outputs a divided voltage obtained by dividing the output voltage;
a reference voltage generating circuit that generates a reference voltage based on the input voltage;
an error amplifier that receives the divided voltage and the reference voltage and outputs a first signal corresponding to the difference between the divided voltage and the reference voltage;
a feedforward circuit that detects the input voltage and outputs a second signal corresponding to a current inversely proportional to the input voltage;
a multiplier that multiples the first signal by the second signal and outputs a third signal obtained;
a control circuit that outputs, based on the third signal, a control signal for controlling on/off of the switching transistor so that the divided voltage is equal to the reference voltage; and
a compensating circuit that regulates a phase of the first signal.

10. The DC/DC converter according to claim 9 wherein the switching transistor is a MOS transistor.

11. The DC/DC converter according to claim 9, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and
a sixth transistor connected between the signal terminal and the ground, having a control electrode connected to the second end of the third transistor.

12. The DC/DC converter according to claim 10, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and a sixth transistor connected between the signal terminal and the ground, having a control electrode connected to the second end of the third transistor.

13. An inverting DC/DC converter comprising:
an input terminal that receives an input voltage;
an output terminal that outputs an output voltage;
a switching transistor having a first end connected to the input terminal;
an inductor connected between a second end of the switching transistor and a ground;
a diode having a cathode connected to the second end of the switching transistor and an anode connected to the output terminal;
a capacitor connected between the output terminal and the ground;
a voltage dividing circuit connected between the output terminal and the ground, that outputs a divided voltage obtained by dividing the output voltage;
a reference voltage generating circuit that generates a reference voltage based on the input voltage;
an error amplifier that receives the divided voltage and the reference voltage and outputs a first signal corresponding to the difference between the divided voltage and the reference voltage;
a feedforward circuit that detects the input voltage and outputs a second signal corresponding to a current inversely proportional to the input voltage;
a multiplier that multiples the first signal by the second signal and outputs a third signal obtained; and
a control circuit that outputs, based on the third signal, a control signal for controlling on/off of the switching transistor so that the divided voltage is equal to the reference voltage.

14. The DC/DC converter according to claim 13 wherein the switching transistor is a MOS transistor.

15. The DC/DC converter according to claim 13, further comprising a compensating circuit that regulates a phase of the first signal.

16. The DC/DC converter according to claim 13, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and
a sixth transistor connected between the signal terminal and the ground, having a control electrode connected to the second end of the third transistor.

17. The DC/DC converter according to claim 14, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and
a sixth transistor connected between the signal terminal and the ground, having a control electrode connected to the second end of the third transistor.

18. The DC/DC converter according to claim 15, wherein the feedforward circuit comprises:
a first constant current source having a first end connected to the input terminal;
a first transistor connected between a second end of the first constant current source and the ground;
a second transistor having a first end connected to the input terminal and a second end connected to a control electrode of the first transistor, a conduction type of the second transistor being equal to a conduction type of the first transistor;
a second constant current source connected between the second end of the second transistor and the ground;
a third transistor having a first end connected to the input terminal and a control electrode connected to a first end of the first transistor, a conduction type of the third transistor being equal to the conduction type of the first transistor;
a resistance element having a first end connected to the input terminal;
a fourth transistor connected between a second end of the resistance element and the ground;
a fifth transistor connected between a second end of the third transistor and the ground, a first current flowing through the fifth transistor, the first current mirroring a second current through the fourth transistor;
a signal terminal that outputs the second signal; and
a sixth transistor connected between the signal terminal and the ground, having a control electrode connected to the second end of the third transistor.

19. The DC/DC converter according to claim 16, wherein the first to sixth transistors are bipolar transistors.

20. The DC/DC converter according to claim 16, wherein the first to sixth transistors are MOS transistors.

* * * * *